United States Patent
Price, III

(10) Patent No.: US 6,662,299 B1
(45) Date of Patent: Dec. 9, 2003

(54) METHOD AND APPARATUS FOR RECONSTITUTING AN ENCRYPTION KEY BASED ON MULTIPLE USER RESPONSES

(75) Inventor: William F. Price, III, Los Altos, CA (US)

(73) Assignee: PGP Corporation, Palo Alto, CA (US)

( * ) Notice: Subject to any disclaimer, the term of this patent is extended or adjusted under 35 U.S.C. 154(b) by 0 days.

(21) Appl. No.: 09/429,217

(22) Filed: Oct. 28, 1999

(51) Int. Cl.[7] .................................................. G06F 1/24
(52) U.S. Cl. ........................ 713/171; 713/200; 713/201
(58) Field of Search ................................. 713/171, 200, 713/201

(56) References Cited

PUBLICATIONS

Shamir, A., "How to Share a Secret", Communications of the ACM, vol. 22, No. 11, Nov. 1979, pp. 612–613.
Blakely G.R., "Safeguarding Cryptographic Keys", Proceeding of the National Computer Conference, 1979, AFIPS Converence Proceedings, vol. 48 (1979), pp. 313–317.

*Primary Examiner*—Thomas R. Peeso
(74) *Attorney, Agent, or Firm*—Cooley Godward LLP

(57) ABSTRACT

One embodiment of the present invention provides a system that facilitates encrypting and decrypting a data item. The system operates by encrypting a data item with a session key using a symmetric encryption mechanism to produce an encrypted data item. Next, the system splits the session key into a plurality of shares so that the session key can be reconstituted from a predefined number of shares. The system also receives a plurality of responses from the user (which may be responses to questions), and encrypts the plurality of shares with the plurality of responses using the symmetric encryption mechanism to generate a plurality of encrypted shares. The plurality of encrypted shares are stored for later retrieval. In one embodiment of the present invention, the system decrypts the data item by, receiving a plurality of new responses from the user, and attempting to decrypt the plurality of encrypted shares with the plurality of new responses. Note that a share will be successfully decrypted if a new response matches a response that was previously used to encrypt the share. If the predefined number of shares are successfully decrypted, the system uses the successfully decrypted shares to reconstitute the session key, and then uses the session key to decrypt the encrypted data item.

26 Claims, 5 Drawing Sheets

METHOD AND APPARATUS FOR RECONSTITUTING AN ENCRYPTION KEY BASED ON MULTIPLE USER RESPONSES

BACKGROUND

1. Field of the Invention

The present invention relates to encryption of data within computer systems. More particularly, the present invention relates to a method and an apparatus for encrypting and decrypting item of data based upon multiple responses received from a user.

2. Related Art

The advent of computer networks, such as the Internet, has led to an explosion in the development of applications that facilitate rapid dissemination of information. It is presently possible to access information from millions of interconnected computers worldwide through a simple network connection.

One problem with this increased availability of information is that it is becoming increasingly harder to keep sensitive information confidential. Many individuals within an organization work with sensitive information that must be kept secret from competitors of the organization. This data typically resides in electronic form on networked computer systems. Data stored in this way can be easily copied onto a disk or transported across a computer network. Consequently, such data can easily end up in the wrong hands.

One way to remedy this problem is to "encrypt" sensitive data using an encryption key so that only someone who possesses a corresponding decryption key can decrypt the message. (Note that for commonly used symmetric encryption mechanisms the encryption key and the decryption key are the same key.) In this way, a person working with sensitive data can use a personal encryption key to encrypt the sensitive data. This personal encryption key can be automatically formed from a password that is supplied by the user.

Unfortunately, using passwords to encrypt data can create administrative problems because passwords are commonly forgotten. This is especially a problem when passwords must be periodically changed for security reasons. Consequently, system administrators are continually responding to calls related to forgotten passwords.

System administrators typically deal with this problem by maintaining a backup copy of all user passwords, which enables the system administrators to lookup forgotten passwords. However, maintaining backup copies of passwords can severely compromise computer system security, because system administrators cannot always be trusted to safeguard sensitive information and passwords can easily end up in the wrong hands.

One solution to this problem is to use a key escrow system in which a personal encryption key (or password) to be split up into shares and distributed to multiple trusted parties. In order to reconstruct the personal encryption key, the shares must be gathered from the multiple trusted parties. Such key escrow systems can be quite effective. However, reconstructing a personal encryption key by gathering information from the multiple trusted parties can be a very time-consuming process, and is hence impractical to perform frequently.

What is needed is a mechanism that allows a personal encryption key to be reconstructed without requiring a user to remember a specific password that can easily be forgotten.

SUMMARY

One embodiment of the present invention provides a system that facilitates encrypting and decrypting a data item. The system operates by encrypting a data item with a session key using a symmetric encryption mechanism to produce an encrypted data item. Next, the system splits the session key into a plurality of shares so that the session key can be reconstituted from a predefined number of shares. The system also receives a plurality of responses from the user (which may be responses to questions), and encrypts the plurality of shares with the plurality of responses using the symmetric encryption mechanism to generate a plurality of encrypted shares. The plurality of encrypted shares are stored for later retrieval.

In one embodiment of the present invention, the system decrypts the data item by, receiving a plurality of new responses from the user, and attempting to decrypt the plurality of encrypted shares with the plurality of new responses. Note that a share will be successfully decrypted if a new response matches a response that was previously used to encrypt the share. If the predefined number of shares are successfully decrypted, the system uses the successfully decrypted shares to reconstitute the session key, and then uses the session key to decrypt the encrypted data item.

One embodiment of the present invention further comprises determining if a share from the plurality of shares can be decrypted by encrypting a marker with the share and looking for the marker in the share after the share is decrypted.

In one embodiment of the present invention, the data item includes a private key that is associated with a public key to form a public key-private key pair.

In one embodiment of the present invention, the password includes a passphrase that can be made up of more than one word.

In one embodiment of the present invention, the plurality of responses are answers to questions supplied by the user. In another embodiment, the plurality of responses are answers to default questions. In yet another embodiment, the plurality of responses are different passwords.

In one embodiment of the present invention, there are five shares, and three out of the five shares can be used to reconstitute the session key.

In one embodiment of the present invention, receiving the session key further comprises generating the session key using a random number generator.

One embodiment of the present invention provides a system that facilitates encrypting and decrypting a private key. The system operates by generating a session key and encrypting the private key with the session key using a symmetric encryption mechanism to generate an encrypted private key. The system encrypts the session key with a password belonging to a user using the symmetric encryption mechanism to produce an encrypted session key. The system splits the session key into a plurality of shares so that the session key can be reconstituted from a predefined number of shares from the plurality of shares. The system next receives a plurality of responses from a user and hashes each of the plurality of responses with a first value to produce a first plurality of hashed responses. Next, the system encrypts the plurality of shares with the first plurality of hashed responses to generate a plurality of encrypted shares. The system also hashes each of the plurality of responses with a second value to produce a second plurality of hashed responses, and then encrypts the plurality of encrypted shares with the second plurality of hashed responses to generate a plurality of final encrypted shares. Finally, the system sends the plurality of final encrypted shares to a server so that the server can store the plurality of final encrypted shares.

In one embodiment of the present invention, the system decrypts the encrypted private key when the password is unavailable by, receiving a plurality of new responses from the user and hashing each of the plurality of new responses with the first value to produce a first plurality of hashed new responses. The system also hashes each of the plurality of new responses with the second value to produce a second plurality of hashed new responses. The system sends the second plurality of hashed new responses from a computer system belonging to the user to the server. At the server, the system attempts to decrypt the plurality of final encrypted shares with the second plurality of hashed new responses. Note that successfully decrypting a share from the plurality of final encrypted shares results in a corresponding share from the plurality of encrypted shares. If the predefined number of shares are successfully decrypted, the server sends the successfully decrypted shares to the computer belonging to the user. At the computer, the system decrypts the successfully decrypted shares with the first plurality of hashed new responses to produce the predefined number of shares of the session key. The system uses the predefined number of shares to reconstitute the session key, and decrypts the encrypted private key with the session key.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Networked Computer System

Figure 1:
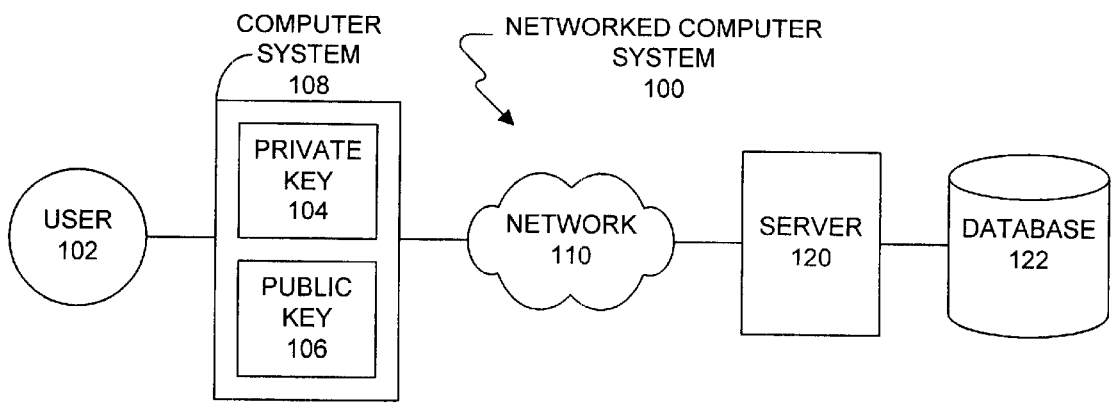
FIG. 1 illustrates a networked computer system in accordance with an embodiment of the present invention.

FIG. 1 illustrates a networked computer system 100 in accordance with an embodiment of the present invention. Networked computer system 100 includes computer system 108, which is coupled to server 120 through network 110. Computer system 108 can include any type of computer system that can be operated by a user 102. This includes, but is not limited to, a computer system based upon a microprocessor, a mainframe processor, a device controller, and a computational engine within an appliance. In the embodiment illustrated in FIG. 1, computer system 108 includes private key 104 and public key 106, which collectively form a private key-public key pair in such a way that a message to be encrypted using public key 106 and decrypted using private key 104. Note that private key 104 cannot be deduced from public key 106 in a tractable amount of computational time. Network 110 can include any type of wire or wireless communication channel capable of coupling together computer system 108 and server 120. This includes, but is not limited to, a local area network, a wide area network, or a combination of networks. In one embodiment of the present invention, network 110 includes the Internet.

Server 120 can include any node on a computer network including a mechanism for servicing requests from a client for computational and/or data storage resources. In the embodiment of the present invention illustrated in FIG. 1, server 120 services requests to decrypt an encrypted session key 206. Server 120 is coupled to database 122. Database 122 can include any type of storage system that is capable of storing data for server 120.

Encrypting and Decrypting a Session Key

Figure 2:
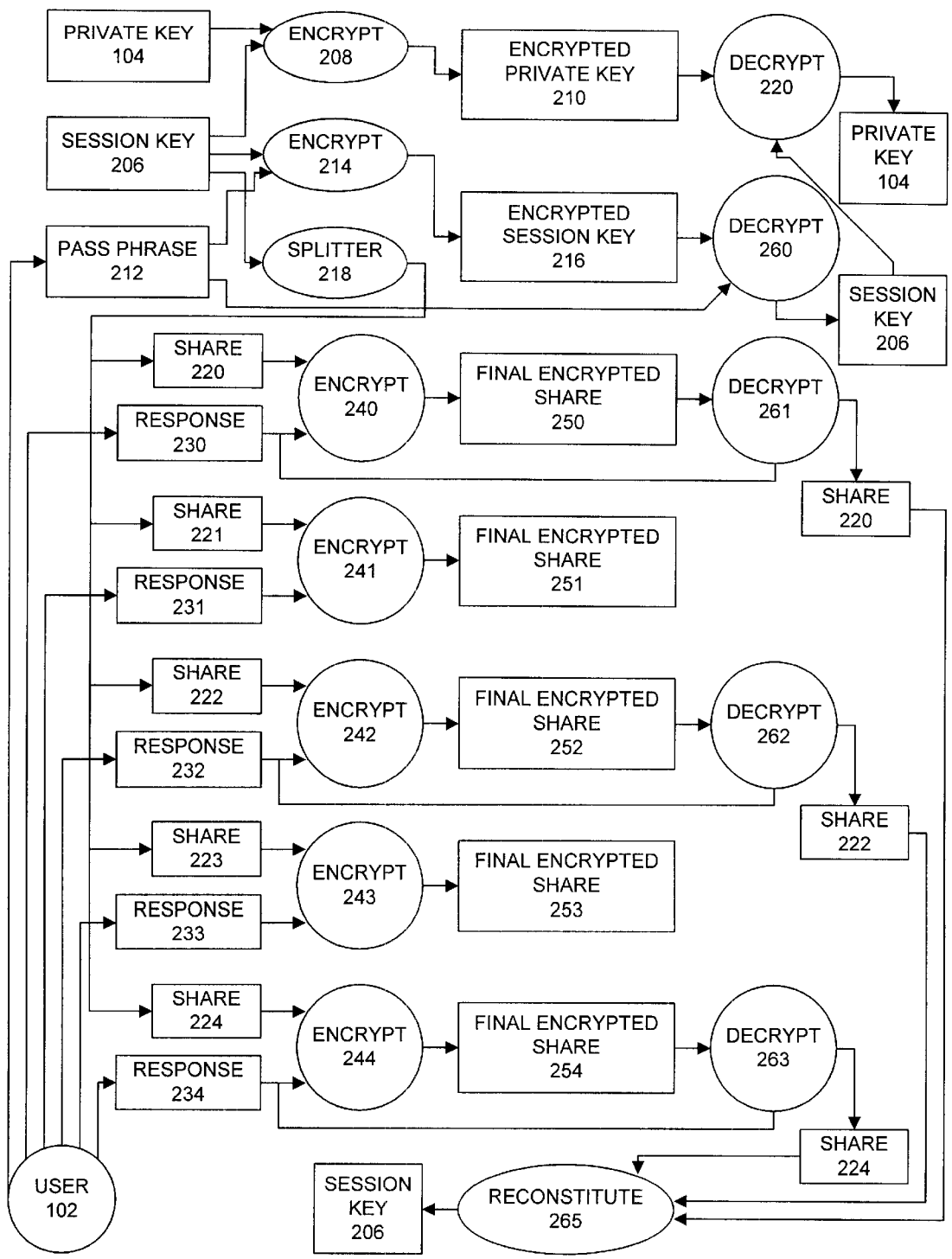
FIG. 2 illustrates the process of encrypting and decrypting a session key in accordance with an embodiment of the present invention.

FIG. 2 illustrates the process of encrypting and decrypting a session key 206 in accordance with an embodiment of the present invention. The system starts with a session key 206, which is typically randomly generated for a specific session. Session key 206 us used to encrypt private key 104 through encryption mechanism 208 to form encrypted private key 210. Note that encryption mechanism 208 is a symmetric encryption mechanism. This means that session key 206 can also be used to decrypt encrypted private key 210. One embodiment of the present invention uses the Data Encryption Standard 3 (DES3) algorithm to perform this encryption.

Session key 206 is itself encrypted with a passphrase 212 received from user 102 to form encrypted session key 216. Note that a "passphrase" is a longer version of a password, and typically contains an entire phrase instead of a single password.

In order to decrypt encrypted private key 210, the system asks for and again receives passphrase 212 from user 102. Passphrase 212 is used to decrypt encrypted session key 216 to reconstitute session key 206. Session key 206 is then used to decrypt encrypted private key 210 to reconstitute private key 104.

The above-described process works only if passphrase 212 is available. To deal with the case where passphrase 212 is forgotten, the system receives five responses 230–234 from user 102. Responses 230–234 can be answers to questions that user 102 formulates, such as "what is the name of my dog?" or "who was my second grade teacher?" Responses 230–234 can also be responses to default questions asked by the system. Responses 230–234 can additionally be passphrases instead of answers to questions.

The system splits session key 206 into a number of shares 220–224 in such a way that session key 206 can be reconstructed given a predefined number of shares. In the example illustrated in FIG. 2, session key 206 can be reconstructed given any three of the five shares 120–124. This type of splitting can be accomplished using the known splitting algorithms. For example, see "How to Share a Secret" by A. Shamir, Communications of the ACM, Vol. 22, No. 11, Nov. 1979, pp. 612–613. Next, each of shares 220–224 is encrypted using responses 230–234 to form final encrypted shares 250–254.

In order to decrypt encrypted private key 210 without passphrase 212, the system asks user 102 for at least three out of five responses 230–234. For example, in FIG. 2 user 102 provides responses 230, 232 and 234. These responses are used to decrypt final encrypted shares 250, 252 and 254, respectively, in order to reconstitute shares 220, 222 and 224. Shares 220, 222 and 224 are then used to reconstitute session key 206. Session key 206 is itself used to decrypt encrypted private key 210 to restore private key 104.

Note that user 102 simply has to remember three of five responses 230–234 in order to decrypt encrypted private key 210. This system operates under the assumption that a person may not always remember a single password, but is very likely to remember to answers to three out of five questions or passphrases.

Also note that although the present invention is described in terms of a system that requires three out of five shares to reconstitute session key 206, the present invention can generally be applied to systems that use different numbers of shares and have different requirements for the minimum number of shares required to reconstitute session key 206.

Figure 3:
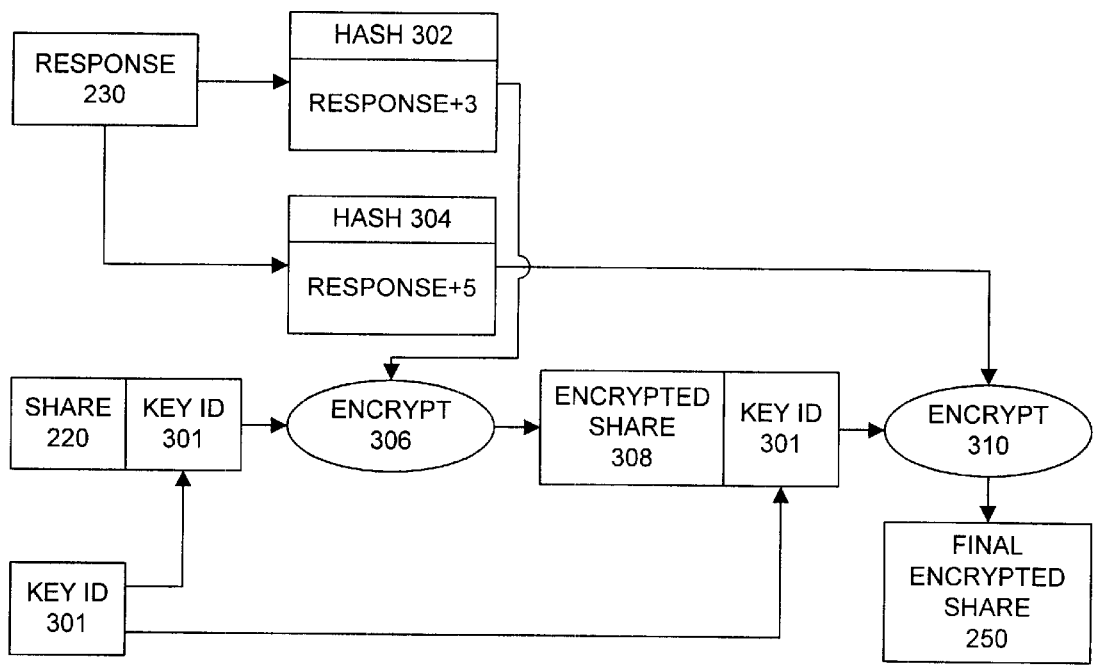
FIG. 3 illustrates the process of encrypting a single share of a session key in accordance with an embodiment of the present invention.

FIG. 3 illustrates in more detail the process of encrypting a single share 220 of a session key 206 in accordance with an embodiment of the present invention. This process involves encrypting share 220 twice in order to overcome potential security problems that can arise from insecure communications across network 110 between computer system 108 and server 120 in FIG. 1. First, response 230 is hashed in two different ways. (Response 230)+3 is hashed to form hash 302. (Response 230)+5 is hashed to form hash 304. Note that any two distinct values can be used in place of three and five. Also note that the hashing can be performed using any one of a number of well-known hashing functions, such as SHA1 (secure hash algorithm 1) or MD5 (message digest algorithm 5).

Share 220 is appended to key ID 301. Key ID 301 can include any value that can be used to identify a particular session key. Next, share 220 and key ID 301 are encrypted using hash 302 to form encrypted share 308. Encrypted share 308 is appended to key ID 301 and the entire quantity is encrypted using hash 304 to form final encrypted share 250.

Next, final encrypted share 250 is sent from computer system 108 to server 120 across network 110 so that server 120 can store final encrypted share 250 in database 122. Also note that the four other shares, 221–224, are similarly encrypted to form final encrypted shares 251–254, which are sent to server 120.

Structure of BLOB

Figure 4:
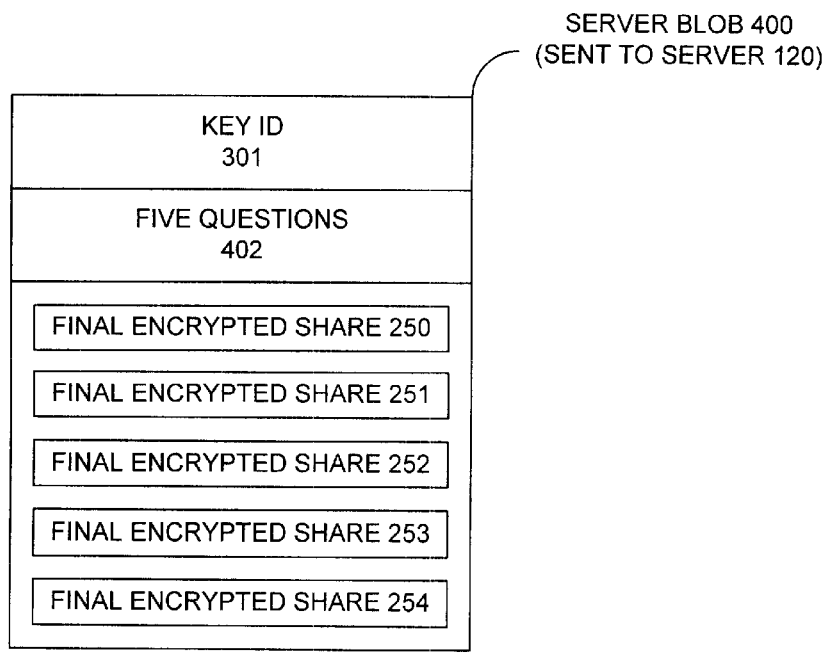
FIG. 4 illustrates the structure of a server BLOB (Binary Large OBject) which is sent to a server in accordance with an embodiment of the present invention.

FIG. 4 illustrates the structure of a server BLOB 400 (Binary Large OBject), which is sent from computer system 108 to a server 120 in accordance with an embodiment of the present invention. Server BLOB 400 includes final encrypted shares 250–254 that are described above with reference to FIGS. 2 and 3. Server BLOB 400 additionally includes Key ID 301 and five questions 402. Key ID 301 is an identifier that identifies session key 206. Five questions 402 are questions formed by user 102 that correspond to responses 230–234. Five questions 402 may also include default questions asked by the system. Note that in the case where five responses 230–234 are merely passphrases, and not responses to questions, the five questions 402 contain NULL values.

Process of Encrypting Session Key

Figure 5:
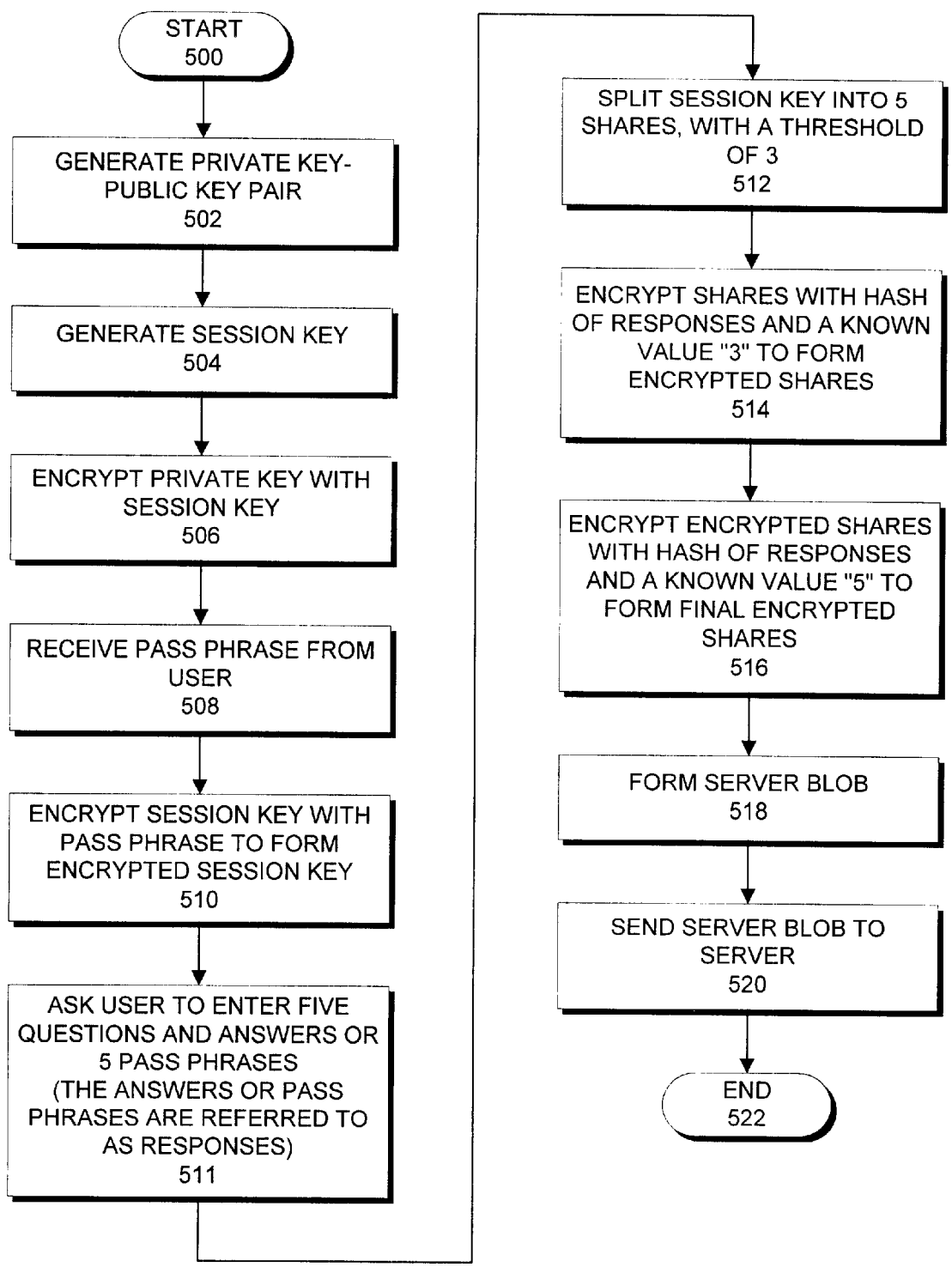
FIG. 5 is a flow chart illustrating how a session key is encrypted in accordance with an embodiment of the present invention.

FIG. 5 is a flow chart illustrating how a session key 206 is encrypted in accordance with an embodiment of the present invention. Computer system 108 belonging to user 102 first generates a public key-private key pair, including private key 104 and public key 106 (step 502). Computer system 108 also generates session key 206 using a random number generator (step 504). Next, session key 206 is used to encrypt private key 104 and private key 104 (step 506).

Computer system 108 then receives passphrase 212 from user 102 (step 508). Session key 206 is encrypted with passphrase 212 to form encrypted session key 216 (step 510). This encryption process may involve first hashing the password, and then encrypting session key 206 with the hash of the passphrase.

Next, computer system 108 asks user 102 to enter five questions and five answers or alternatively five passphrases (step 511). User 102 then enters five responses. Note that a response can either be a passphrase or an answer to a question.

Next, session key 206 is split into five shares 220–224 in such a way that any three out of the five shares 220–224 can be combined to reconstitute session key 206 (step 512). Next, shares 220–224 are encrypted with responses 230–234 hashed with the number three to form encrypted shares (step 514). The encrypted shares are encrypted with responses 230–234 hashed with the number five to form final encrypted shares 250–254 (step 516). Final encrypted shares 250–254 are then combined with key ID 301 and five questions 402 to form server BLOB 400 (step 518). Server BLOB 400 is then sent to server 120 for safe-keeping in database 122 (step 520).

Process of Decrypting Session Key

Figure 6:
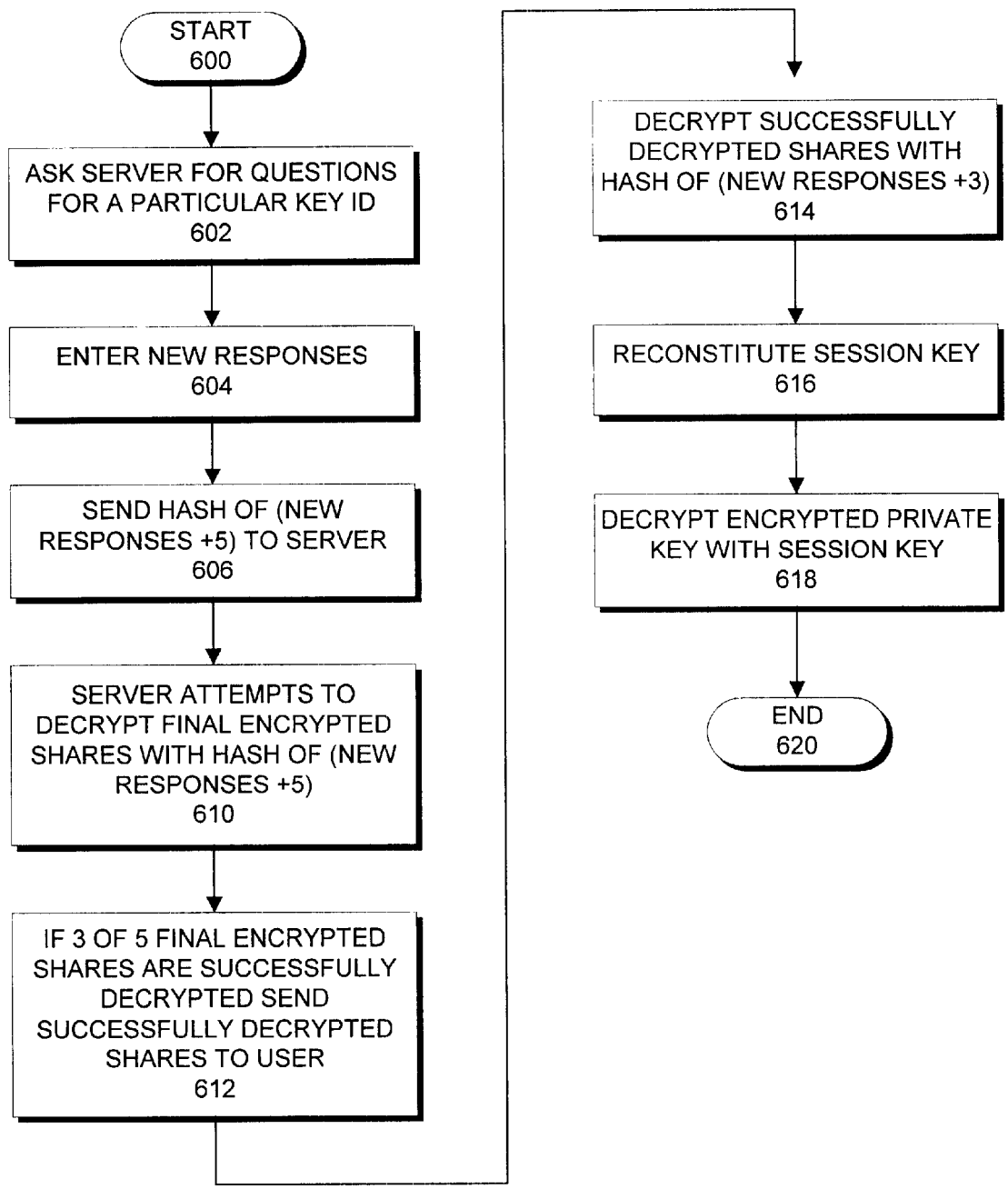
FIG. 6 is a flow chart illustrating how a session key is decrypted in accordance with an embodiment of the present invention.

FIG. 6 is a flow chart illustrating how session key 206 is decrypted when passphrase 212 is unavailable in accordance with an embodiment of the present invention. Computer system 108 first asks server 120 for questions for a key ID 301 associated with session key 206 (step 602). Server 120 looks up the corresponding server BLOB 400 in database 122 and sends the questions to computer system 108. User 102 enters new responses to the questions (step 604), and then sends the hash of the (new responses+5) to server 120 (step 606).

Server 120 attempts to decrypt final encrypted shares 250–254 with a hash of (new responses+5) (step 610). For example, server 120 attempts to decrypt final encrypted share 250 to form encrypted share 308 appended to key ID 301. Server 120 knows the decryption is successful if it sees key ID 301 in the result. Note that any constant value or marker can be used in place of key ID 301. Also note that server 120 may have to try to decrypt each of the five final encrypted shares 250–254 with each of the five new responses because the order of the new responses may not be the same as the original responses that were used to produce final encrypted shares 250–254.

If three of five encrypted shares are successfully decrypted, they are sent from server 120 to computer system 108 (step 612). Computer system 108 decrypts the successfully decrypted shares with a hash of the new responses+3 to restore at least three of shares 220–224 (step 614). The restored shares 220–224 are then combined to reconstitute session key 206 (step 616). Finally, session key 206 is used to decrypt encrypted private key 210 to restore private key 104 (step 618).

Note that the above-described process is immune from an attack in which an adversary spoofs server 120 in an attempt to gather responses 230–234. This is because responses 230–234 are hashed with the number five before being sent across network 110 to server 120. Server 120 is able to partially decrypt final encrypted shares 250–254. However, server 120 is not able to completely decrypt final encrypted shares 250–254, because server 120 is never given hash of responses+3. Furthermore, server 120 is not able to deduce hash of responses+3 given hash of responses+5.

Hence, even if an adversary tricks a user into providing hash of responses +5 and is able to obtain server BLOB 400, the adversary will not be able to restore shares 220–224, because the adversary does not have access to hash of responses+3. This is because the hash of responses+3 is maintained within computer system 108, and is never sent across network 110.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method that facilitates encrypting and decrypting a data item, comprising:

receiving a session key;

encrypting the data item with the session key using a symmetric encryption mechanism to generate an encrypted data item, the symmetric encryption mechanism allowing the encrypted data item to be decrypted using the session key;

splitting the session key into a plurality of shares so that the session key can be reconstituted from a predefined number of shares from the plurality of shares;

receiving a plurality of responses from the user;

encrypting the plurality of shares with the plurality of responses using the symmetric encryption mechanism to generate a plurality of encrypted shares, the symmetric encryption mechanism allowing the plurality of encrypted shares to be decrypted using the plurality of responses;

erasing the session key; and storing the plurality of encrypted shares for later retrieval.

2. The method of claim 1, further comprising encrypting the session key with a password belonging to a user using the symmetric encryption mechanism to produce an encrypted session key.

3. The method of claim 2, further comprising decrypting the encrypted data item using the password by, decrypting the encrypted session key with the password to restore the session key; and decrypting the encrypted data item with the session key to restore the data item.

4. The method of claim 1, further comprising decrypting the encrypted data item by, receiving a plurality of new responses from the user;

attempting to decrypt the plurality of encrypted shares with the plurality of new responses, wherein a share will be successfully decrypted if a new response matches a response that was used to encrypt the share;

if the predefined number of shares are successfully decrypted, using the predefined number of shares to reconstitute the session key; and decrypting the encrypted data item with the session key to restore the data item.

5. The method of claim 4, further comprising determining if a share from the plurality of shares can be decrypted by encrypting a marker with the share and then looking for the marker in the share after the share is decrypted.

6. The method of claim 1, wherein the data item includes a private key that is associated with a public key to form a public key-private key pair.

7. The method of claim 1, wherein the password includes a passphrase made up of at least one word.

8. The method of claim 1, wherein the plurality of responses are answers to questions supplied by the user.

9. The method of claim 1, wherein the plurality of responses are different passwords.

10. The method of claim 1, wherein the plurality of responses are answers to default questions.

11. The method of claim 1, wherein there are five shares in the plurality of shares, and wherein three out of five shares can be used to reconstitute the session key.

12. The method of claim 1, wherein receiving the session key further comprises generating the session key using a random number generator.

13. A computer readable storage medium storing instructions that when executed by a computer cause the computer to perform a method that facilitates encrypting and decrypting a data item, comprising:

receiving a session key;

encrypting the data item with the session key using a symmetric encryption mechanism to generate an encrypted data item, the symmetric encryption mechanism allowing the encrypted data item to be decrypted using the session key;

splitting the session key into a plurality of shares so that the session key can be reconstituted from a predefined number of shares from the plurality of shares;

receiving a plurality of responses from the user;

encrypting the plurality of shares with the plurality of responses using the symmetric encryption mechanism to generate a plurality of encrypted shares, the symmetric encryption mechanism allowing the plurality of encrypted shares to be decrypted using the plurality of responses;

erasing the session key; and storing the plurality of encrypted shares for later retrieval.

14. The computer readable storage medium storing instructions of claim 13, wherein the instructions additionally cause the computer to decrypt the encrypted data item by, receiving a plurality of new responses from the user;

attempting to decrypt the plurality of encrypted shares with the plurality of new responses, wherein a share will be successfully decrypted if a new response matches a response that was used to encrypt the share;

if the predefined number of shares are successfully decrypted, using the predefined number of shares to reconstitute the session key; and decrypting the encrypted data item with the session key to restore the data item.

15. An apparatus that facilitates encrypting and decrypting a data item, comprising:

a receiving mechanism that receives a session key;

a symmetric encryption mechanism that is configured to encrypt the data item with the session key to generate an encrypted data item, the symmetric encryption mechanism allowing the encrypted data item to be decrypted using the session key;

a splitting mechanism that is configured to split the session key into a plurality of shares so that the session key can be reconstituted from a predefined number of shares from the plurality of shares;

a receiving mechanism that is configured to receive a plurality of responses from the user;

wherein the symmetric encryption mechanism is configured to encrypt the plurality of shares with the plurality of responses using the symmetric encryption mechanism to generate a plurality of encrypted shares, the symmetric encryption mechanism allowing the plurality of encrypted shares to be decrypted using the plurality of responses; and a storage mechanism that stores the plurality of encrypted shares for later retrieval.

16. The apparatus of claim 15, further comprising a decryption mechanism that decrypts the encrypted data item, the decryption mechanism being configured to, receive a plurality of new responses from the user;

decrypt the plurality of encrypted shares with the plurality of new responses, wherein a share will be successfully decrypted if a new response matches a response that was used to encrypt the share;

use the predefined number of shares to reconstitute the session key if the predefined number of shares are successfully decrypted; and decrypt the encrypted data item with the session key to restore the data item.

17. The apparatus of claim 15, wherein the data item includes a private key that is associated with a public key to form a public key-private key pair.

18. The apparatus of claim 15, wherein the plurality of responses are answers to questions.

19. The apparatus of claim 15, wherein the plurality of responses are different passwords.

20. A method that facilitates decrypting a private key that has been encrypted using a password if the password becomes unavailable, the private key belonging to a user and being associated with a public key to form a public key-private key pair, the method comprising:

generating a session key;

encrypting the private key with the session key using a symmetric encryption mechanism to generate an encrypted private key, the symmetric encryption mechanism allowing the encrypted private key to be decrypted using the session key;

encrypting the session key with the password belonging to a user using the symmetric encryption mechanism to produce an encrypted session key;

splitting the session key into a plurality of shares so that the session key can be reconstituted from a predefined number of shares from the plurality of shares;

receiving a plurality of responses from the user;

hashing each of the plurality of responses with a first value to produce a first plurality of hashed responses;

encrypting the plurality of shares with the first plurality of hashed responses using the symmetric encryption mechanism to generate a plurality of encrypted shares;

hashing each of the plurality of responses with a second value to produce a second plurality of hashed responses;

encrypting the plurality of encrypted shares with the second plurality of hashed responses using the symmetric encryption mechanism to generate a plurality of final encrypted shares; and sending the plurality of final encrypted shares to a server so that the server can store the plurality of final encrypted shares.

21. The method of claim 20, further comprising decrypting the private key using the password by, decrypting the encrypted session key with the password to restore the session key; and decrypting the encrypted private key with the session key to restore the private key.

22. The method of claim 20, further comprising decrypting the encrypted private key when the password is unavailable by, receiving a plurality of new responses from the user;

hashing each of the plurality of new responses with the first value to produce a first plurality of hashed new responses;

hashing each of the plurality of new responses with the second value to produce a second plurality of hashed new responses;

sending the second plurality of hashed new responses from a computer belonging to the user to the server;

attempting to decrypt the plurality of final encrypted shares with the second plurality of hashed new responses at the server;

wherein successfully decrypting a share from the plurality of final encrypted shares results in a corresponding share from the plurality of encrypted shares;

if the predefined number of shares are successfully decrypted, sending the successfully decrypted shares from the server to the computer belonging to the user;

at the computer belonging to the user, decrypting the successfully decrypted shares with the first plurality of hashed new responses to produce at least the predefined number of shares of the session key;

using the predefined number of shares to reconstitute the session key; and decrypting the encrypted private key with the session key to restore the private key.

23. The method of claim 20, further comprising determining if a share from the plurality of final encrypted shares can be decrypted by encrypting a marker with the share and then looking for the marker after the share is decrypted.

24. The method of claim 20, wherein the plurality of responses are answers to questions.

25. The method of claim 20, wherein the plurality of responses are different passwords.

26. The method of claim 20, wherein there are five shares in the plurality of shares, and wherein three out of five shares can be used to reconstitute the session key.

* * * * *